United States Patent [19]
Anderson et al.

[11] Patent Number: 5,321,640
[45] Date of Patent: Jun. 14, 1994

[54] PRIORITY ENCODER AND METHOD OF OPERATION

[75] Inventors: Donald C. Anderson; Keith D. Dang, both of Austin, Tex.

[73] Assignee: Motorola, Inc., Schaumburg, Ill.

[21] Appl. No.: 982,521

[22] Filed: Nov. 27, 1992

[51] Int. Cl.$^5$ ............................................. G06F 7/00
[52] U.S. Cl. ................................................. 364/715.1
[58] Field of Search ........................ 364/715.1, 715.04

[56] References Cited

U.S. PATENT DOCUMENTS

| | | | |
|---|---|---|---|
| 4,064,421 | 12/1977 | Gajski et al. | 364/715.1 |
| 4,553,220 | 11/1985 | Swanson | 364/715.04 |
| 4,849,920 | 7/1989 | Simpson et al. | 364/715.1 |
| 4,954,978 | 9/1990 | Terane et al. | 364/715.1 |
| 5,111,415 | 5/1992 | Skackleford | 364/715.04 |

*Primary Examiner*—David H. Malzahn
*Attorney, Agent, or Firm*—Lee E. Chastain

[57] ABSTRACT

A priority encoder (12) has a most significant bit circuitry (18), a first less significant bit circuitry (20) and a second less significant bit circuitry (22). The priority encoder detects a leading one within a plurality of data bits. Each data bit is associated with a different one of a plurality of input signals. The most significant bit circuitry is coupled to a first one of the input signals and generates a first output signal and a parallel blocking signal. Both of the first output signal and the parallel blocking signal are representative in a first logic state of a leading one associated with the first signal. The first less significant bit cell is coupled to a second one of the input signals and to the parallel blocking signal. The first less significant bit cell generates a second output signal and a less significant carry signal. Both the second output signal and the less significant carry signal are representative in a first logic state of a leading one associated with the second input signal. The second less significant bit cell is coupled to a third one of the input signals, to the parallel blocking signal and to the less significant carry signal. The second less significant bit cell generates a third output signal representative in a first logic state of a leading one associated with the third input signal.

10 Claims, 3 Drawing Sheets

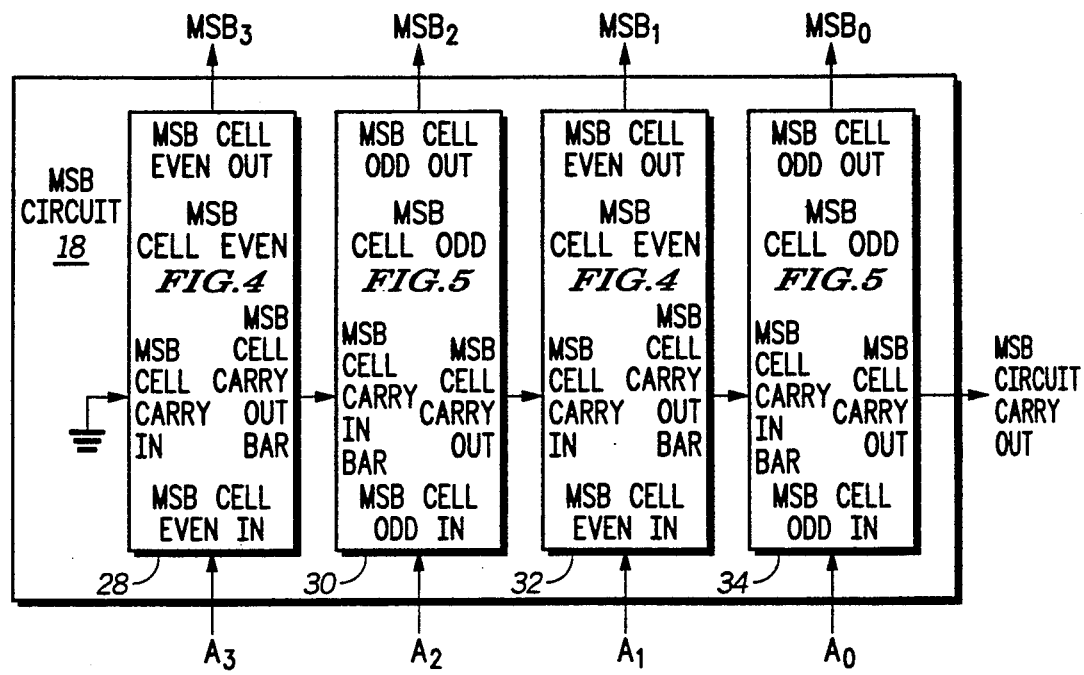
FIG.1
FIG.3
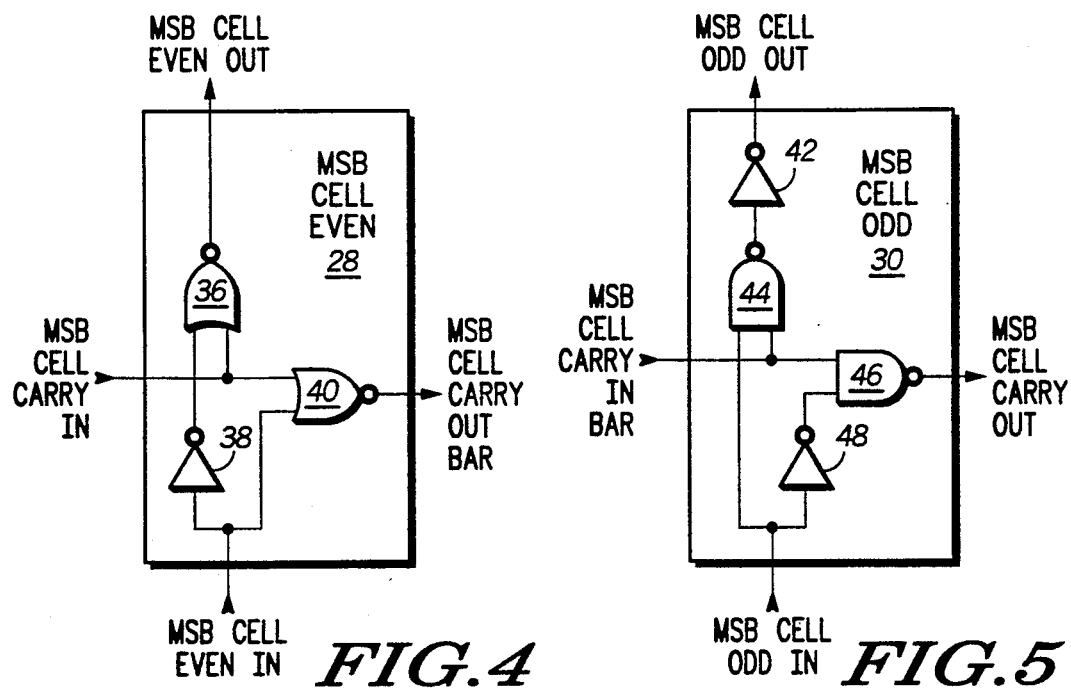
FIG.4    FIG.5

PRIORITY ENCODER AND METHOD OF OPERATION

FIELD OF THE INVENTION

The present invention generally relates to digital computing systems, and more specifically to a priority encoder.

BACKGROUND OF THE INVENTION

In many digital computing applications, it is necessary to identify the first "1" or the last "1" within a data word, or within a string of "1's" and "0's". For instance, it may be necessary in certain data processing applications to normalize the largest data value within a set of data values to a predetermined order of magnitude. After such a normalization the largest data value will have a one in the most significant bit. Generally this process may be accomplished by identifying the largest data word and then determining the position of the first bit containing a one, calculating the number of places between the leading one and the most significant bit and shifting the data word to the left a number of places equal to the calculated difference. Priority encoders are a class of digital circuits that identify the leading or trailing one in a data word.

Known priority encoders determine the leading one, for instance, by generating a carry signal at each bit position and propagating the signal from most significant bit to least significant bit. If any bit is a one, then its carry signal will block all lower order bits from generating a signal indicating a one at their corresponding bit position. The most significant bit will generate a carry signal if its data bit is a logic one. Every other bit will generate a carry signal if its data bit is a logic one or if the carry bit from the next most significant generated a carry signal. A priority encoder designed to determine the trailing one, will propagate the carry signal from least significant bit to most significant bit. In addition, the least significant bit will generate a carry signal if its corresponding data bit is a logic one.

Known priority encoders require a certain propagation time for their outputs to settle on a set of final correct values. A known priority encoder takes N inversion delays to propagate a signal through itself for an N bit data word, where N is an integer. Modern data processing systems regularly process data words of thirty-two, sixty-four and even one hundred and twenty-eight bit lengths. These bit lengths propagate through such a known priority encoder too slowly for many operating speeds.

SUMMARY OF THE INVENTION

A priority encoder has a most significant bit circuitry, a first less significant bit circuitry and a second less significant bit circuitry. The priority encoder detects a leading one within a plurality of data bits. Each data bit is associated with a different one of a plurality of input signals. The most significant bit circuitry is coupled to a first one of the input signals and generates a first output signal and a parallel blocking signal. Both of the first output signal and the parallel blocking signal are representative in a first logic state of a leading one associated with the first input signal. The first less significant bit cell is coupled to a second one of the input signals and to the parallel blocking signal. The first less significant bit cell generates a second output signal and a less significant carry signal. Both the second output signal and the less significant carry signal are representative in a first logic state of a leading one associated with the second input signal. The second less significant bit cell is coupled to a third one of the input signals, to the parallel blocking signal and to the less significant carry signal. The second less significant bit cell generates a third output signal representative in a first logic state of a leading one associated with the third input signal.

A method for detecting the leading one within a plurality of data bits has the steps of receiving a first input signal, generating a first output signal and a blocking signal, receiving a second input signal and the blocking signal, generating a second output signal and a first carry signal, receiving a third input signal, the blocking signal and the first carry signal, and generating a third output signal and a second carry signal. Each data bit is associated with a different one of a plurality of input signals. The first output signal and the blocking signal are logically equal to a first and to a second predetermined signal, repectively, if the first input signal is logically equal to a third predetermined signal. The second output signal and the carry signal are logically equal to a fourth and to a fifth predetermined signal, respectively, if the second input signal and the blocking signal are logically equal to a sixth and to a seventh predetermined signal, respectively. The third output signal and the second carry signal are logically equal to an eighth and to a ninth predetermined signal, respectively, if the first input signal, the blocking signal and the first carry signal are logically equal to a tenth, an eleventh and a twelfth predetermined signal, respectively.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 1 depicts a twelve-bit data word;

FIG. 3 depicts a block diagram of the MSB circuit depicted in FIG. 2;

FIG. 4 depicts a logic diagram of the MSB EVEN cell depicted in FIG. 3;

FIG. 5 depicts a logic diagram of the MSB ODD cell depicted in FIG. 3;

DETAILED DESCRIPTION OF A PREFERRED EMBODIMENT

FIG. 1 depicts a twelve-bit data word 10 containing an exemplary combination of ones and zeros. Priority encoders are a class of digital circuits that detect the leading one or trailing one within a data word. In the depicted example, the leading one occurs in the bit nine position. Conversely, the trailing one occurs in the bit one position. One skilled in the art will understand that a priority encoder may detect either a leading one or a trailing one simply by reversing the order in which the inputs are fed into the priority encoder. In addition, one skilled in the art will understand how to modify either the input signals or the priority encoder itself such that the priority encoder detects a leading zero or a trailing zero within a data word.

Although FIG. 1 depicts a data word having twelve bits and the following discussion describes a priority encoder designed to receive a data word having twelve bits, one skilled in the art may design, in conjunction with the following discussion, a priority encoder for use with a data word having any number of data bits. As will become apparent below, the described priority encoder will have a speed advantage over known priority encoders. This speed advantage makes the disclosed priority encoder suitable for use in high speed environments, for use with large data words, or for both.

Figure 2:
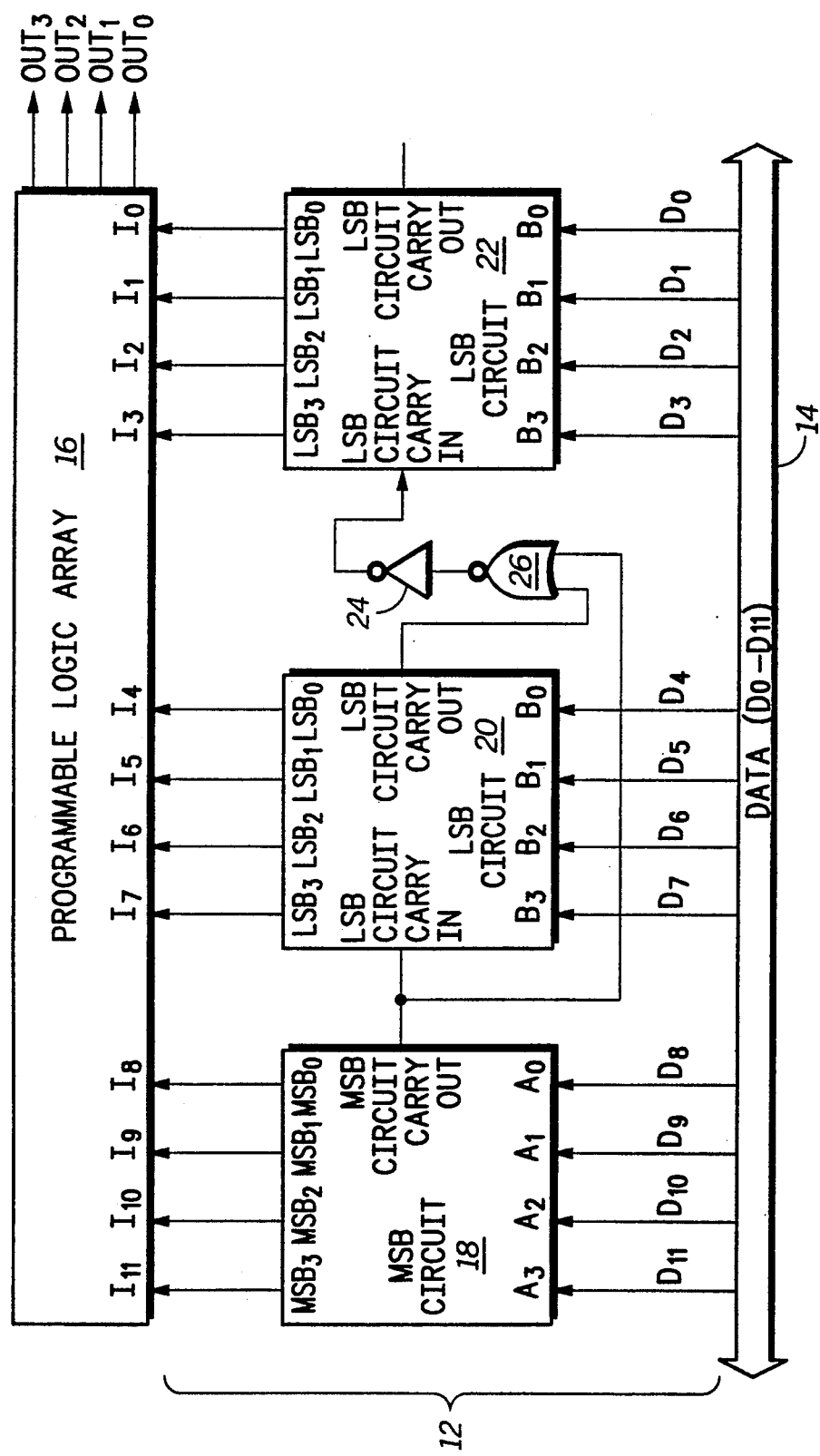
FIG. 2 depicts a block diagram of a priority encoder constructed in accordance with the present invention.

FIG. 2 depicts a block diagram of a priority encoder 12 constructed in accordance with the present invention. Priority encoder 12 receives a data word from DATA bus 14. As described above, DATA bus 14 has twelve data bits, $D_0$ through $D_{11}$. Priority encoder 12 generates twelve output bits which are received by programmable logic array (hereafter "PLA") 16 as $I_0$ through $I_{11}$. Only one or none of the twelve output bits of priority encoder 12 may be a logic one. The output bit having the logic one corresponds to the DATA bit having the leading one. Typically PLA 16 generates an output signal, $Out_0$ through $Out_3$, indicating the number of bit positions between the most significant bit and the position of the leading one. In the example depicted in FIG. 1, PLA 16 would generate the output 0011 modulus 2, indicating that the leading one is in the third bit position. It should be understood that PLA 16 is not part of the disclosed invention. It is included as an example of one use of a priority encoder.

Priority encoder 12 has a most significant bit circuit (hereafter "MSB circuit") 18 and at least one less significant bit circuit (hereafter "LSB circuit") 20. As depicted in FIG. 2, priority encoder 12 has a second LSB circuit 22.

MSB circuit 18 receives the four most significant DATA bits, $D_8$ through $D_{11}$, as inputs $A_0$ through $A_3$, respectively. MSB circuit 18 generates the four output bits, $MSB_0$ through $MSB_3$. As described above, one or none of these outputs may contain a logic one. The ith MSB output bit will contain a logic one if the $(i+8)$ input bit contains the leading one. As depicted, these output bits are connected to the four most significant input bits of PLA 16, $I_8$ through $I_{11}$ respectively. MSB circuit 18 also generates an output signal, MSB_Circuit_Carry_Out. MSB_Circuit_Carry_Out will contain a logic one if one of the inputs to MSB circuit 18 contains the leading one. Otherwise, MSB_Circuit_Carry_Out will contain a logic zero.

LSB circuits 20 and 22 each receive four input bits, $B_0$ through $B_3$, receive the input signal LSB_Circuit_Carry_In and generate four output bits, $LSB_0$ through $LSB_3$. As described above, one or none of these output bits may contain a logic one. The ith LSB output bit will contain a logic one if the ith B input bit contains the leading one. If asserted, the LSB_Circuit_Carry_In signal blocks each bit within the LSB circuit from generating a logic one. As will become apparent below, the LSB_Circuit_Carry_In signal blocks each bit within LSB circuits 20 and 22 from generating a logic one in parallel. By blocking each bit in parallel, the signal propagation delay reduces from twelve inversion delays to seven inversion delays. LSB circuits 20 and 22 each generate an output signal, LSB_Circuit_Carry_Out. LSB_Circuit_Carry_Out will contain a logic one if one of the corresponding LSB circuit's inputs contains the leading one. Otherwise, LSB_Circuit_Carry_Out will contain a logic zero.

The input bits $B_0$ through $B_3$ of LSB circuit 20 are connected to the DATA bits $D_4$ through $D_7$, respectively. The input bits $B_0$ through $B_3$ of LSB circuit 22 are connected to the DATA bits $D_0$ through $D_3$, respectively. The output bits $LSB_0$ through $LSB_3$ of LSB circuit 20 are connected to four middle input bits of PLA 16, $I_4$ through $I_7$, respectively. The output bits $LSB_0$ through $LSB_3$ of LSB circuit 22 are connected to the four least significant input bits of PLA 16, $I_0$ through $I_3$, respectively. The input LSB_Circuit_Carry_In of LSB circuit 20 is connected to the signal MSB_Circuit_Carry_Out of MSB circuit 18. The input LSB_Circuit_Carry_In of LSB circuit 22 is connected to an output of an inverter 24. An input of inverter 24 is connected to an output of a NOR gate 26. First and second inputs to NOR gate 26 are connected to the MSB_Circuit_Carry_Out signal of MSB circuit 18 and to the LSB_Circuit_Carry_Out signal of LSB circuit 20, respectively.

Priority encoder 12 is divided into three equal groups of four bits each for the purposes of explaining the present invention. One skilled in the art may construct, in conjunction with the following discussion, a priority encoder having a different number of LSB circuits, having a different number of input bits within each MSB or LSB circuit, or having both differences.

Additional LSB circuits (not shown) may be added to the depicted priority encoder by providing an additional NOR gate and an additional inverter with each additional LSB circuit. An input LSB_Circuit_Carry_In of the additional LSB circuit is connected to an output of the additional inverter. An input of the inverter is connected to an output of the additional NOR gate. First and second inputs of the NOR gate are connected, respectively, to the MSB_Circuit_Carry_Out signal of MSB circuit 18 and to the LSB_Circuit_Carry_Out of each LSB circuit associated with input bits that are more significant than the input bits connected to the additional LSB circuit. An output signal LSB_Circuit_Carry_Out of the additional LSB circuit is propagated to LSB circuits, if any, corresponding to less significant input bits than are the input bits connected to the additional LSB circuit. Modifications affecting the number of input bits in each MSB and LSB circuit will be described below.

Fewer LSB circuits than depicted may be used in certain embodiments. For instance, it may be desirable to have a MSB circuit 18 and one LSB circuit 20. It should be understood that the one LSB circuit 20 would have at least two LSB cells within it wherein each LSB cell would receive the MSB_Circuit_Carry_Out in parallel with each other LSB cell.

It may be desirable to generate a signal indicating that an input data word contains no ones whatsoever. Such a circuit may be constructed by logically NOR'ing two inputs. The first of these inputs is the output of the last inverter. In the depicted example, inverter 24 is the last inverter. As described above, other implementations may have more LSB circuits and more inverters. In that case, the output from the least significant LSB circuit would be used. The second input to the NOR gate is connected to the LSB_Circuit_Carry_Out signal generated by the last LSB circuit. In the depicted example, LSB circuit 22 is the last LSB circuit. In the event that only one LSB circuit is used, then the one LSB_Circuit_Carry_Out signal would be NOR'ed with the MSB_Circuit_Carry_Out signal to generate the "no one" signal.

FIGS. 3 through 8 depict an embodiment of the disclosed invention particularly optimized for size and speed constraints. In particular, the polarity of certain signals is reversed between adjacent cells to avoid the necessity of extra logic circuits within each cell.

FIG. 3 depicts a block diagram of MSB circuit 18 depicted in FIG. 2. If MSB circuit 18 receives N input bits, then MSB circuit 18 has N MSB cells, where N is an integer. In the depicted embodiment, MSB circuit 18 receives four input bits $A_0$ through $A_3$ and hence has four MSB cells 28, 30, 32 and 34.

Generally, each MSB cell receives an input bit, MSB_Cell_In, and a cell carry bit, MSB_Cell_Carry_In. Each MSB cell generates an output bit, MSB_Cell_Out, and a cell carry bit, MSB_Cell_Carry_Out. As described above, the output bit MSB_Cell_Out will contain a logic one if the corresponding input bit contains a leading one. The MSB cell will generate a logic one on MSB_Cell_Out if the input data bit, MSB_Cell_In, is a logic one and the cell carry input, MSB_Cell_Carry_In, is a logic zero. The cell carry bit output, MSB_Cell_Carry_Out, will be a logic one either if the cell carry input is a logic one or if the cell carry input is a logic zero and the corresponding input bit is a logic one. The last cell carry output generates the signal MSB_Circuit_Out.

Specifically, MSB circuit 18 has two types of alternating cells. Here, MSB cells 28 and 32 are "even" cells. Conversely, MSB cells 30 and 34 are "odd" cells. Consequently each input, MSB_Cell_In, and each output, MSB_Cell_Out, contains either the designator "Odd" or "Even" referring to the type of cell that receives it or generates it. MSB circuit 18 uses two types of cells so that it may reverse the polarity of the cell carry output, MSB_Cell_Carry_In, between alternating cells. This feature allows each cell type to operate faster and require less space than would a single cell type that maintained a constant polarity. Consequently, the cell carry output from an even cell is labeled MSB_Cell_Carry_Out_Bar and the cell carry input to an odd cell is labeled MSB_Carry_In_Bar. Consistent with naming conventions, these signals are active low.

The cell carry input (MSB_Cell_Carry_In) to MSB Cell Even 28 is connected to ground. A cell carry output (MSB_Cell_Carry_Out_Bar) from MSB Cell Even 28 is connected to a cell carry input (MSB_Cell_Carry_In_Bar) of MSB Cell Odd 30. A cell carry output (MSB_Cell_Carry_Out) from MSB Cell ODD 30 is connected to a cell carry input (MSB_Cell_Carry_In) of MSB Cell Even 32. A cell carry output (MSB_Cell_Carry_Out_Bar) from MSB Cell Even 32 is connected to a cell carry input (MSB_Cell_Carry_In_Bar) of MSB Cell Odd 34. A cell carry output (MSB_Cell_Carry_Out) of MSB Cell Odd 34 generates the output MSB_Circuit_Carry_Out.

FIG. 4 depicts a logic diagram of MSB Cell Even 28 or 32 depicted in FIG. 3. The output MSB_Cell_Even_Out is generated by the output of a NOR gate 36. The inputs of NOR gate 36 are connected to the output of an inverter 38 and to the input signal MSB_Cell_Carry_In. The input of inverter 38 is connected to the input MSB_Cell_Even_In. The output MSB_Cell_Carry_Out_Bar is generated by output of a NOR gate 40. The inputs to NOR gate 40 are connected to the inputs MSB_Cell_Carry_In and to MSB_Cell_Even_In.

FIG. 5 depicts a logic diagram of MSB Cell Odd 30 or 34 depicted in FIG. 3. The output MSB_Cell_Odd_Out is generated by an output of an inverter 42. An input of inverter 42 is connected to an output of a NAND gate 44. First and second inputs of NAND gate 44 are connected to the input signals MSB_Cell_Carry_In_Bar and to MSB_Cell_Odd_In, respectively. The output MSB_Cell_Carry_Out is generated by an output of a NAND gate 46. First and second inputs to NAND gate 46 are connected to input MSB_Cell_Carry_In_Bar and to an output of an inverter 48, respectively. An input of inverter 48 is connected to the input MSB_Cell_Odd_In.

Figure 6:
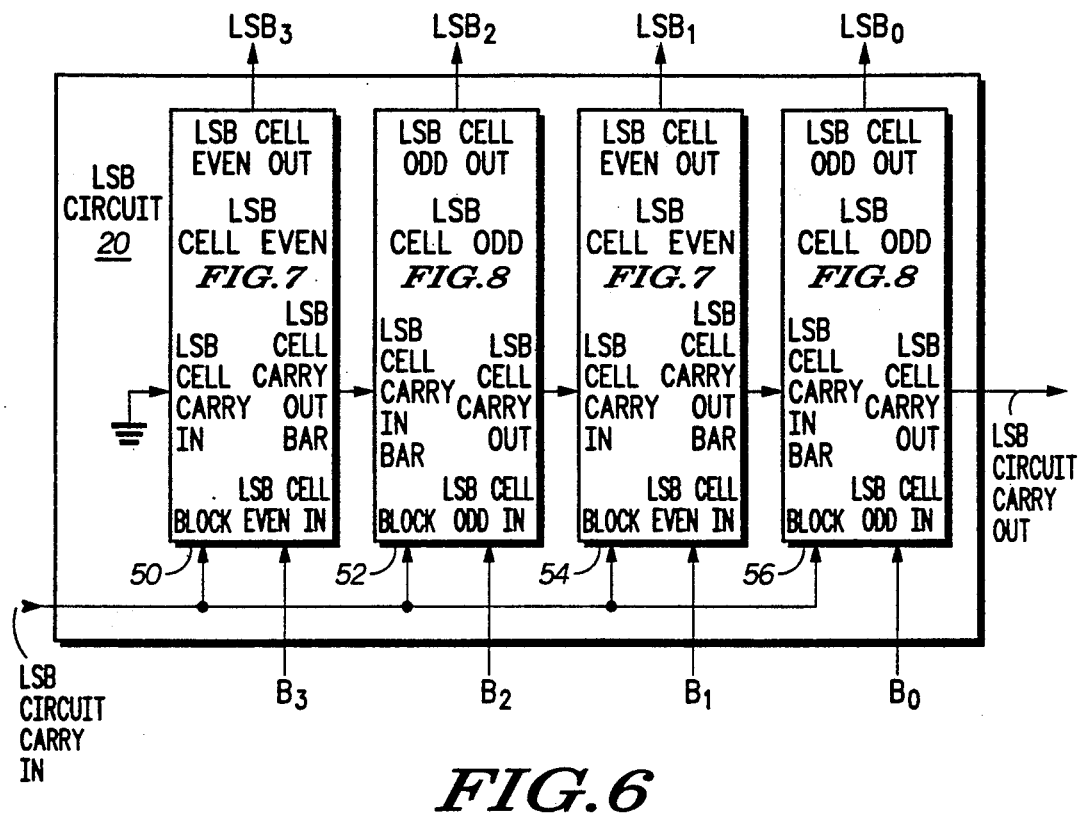
FIG. 6 depicts a block diagram of one the LSB circuits depicted in FIG. 2.

FIG. 6 depicts a block diagram of LSB circuit 20 or 22 depicted in FIG. 2. If LSB circuit receives N input bits, then LSB circuit has N LSB cells, where N is an integer. In the depicted embodiment, LSB circuit 20 receives four input bits $B_0$ through $B_3$ and hence has four LSB cells 50, 52, 54 and 56.

Generally, each LSB cell receives an input bit, LSB_Cell_In, a cell carry bit, LSB_Cell_Carry_In, and a third input BLOCK. Each LSB cell generates an output bit, LSB_Cell_Out, and a cell carry bit, LSB_Cell_Carry_Out. As described above, the output bit LSB_Cell_Out will contain a logic one if the corresponding input bit contains a leading one. The LSB cell will generate a logic one on LSB_Cell_Out if the input data bit, LSB_Cell_In, is a logic one, if the cell carry input, LSB_Cell_Carry_In, is a logic zero and if the input BLOCK is a logic zero. The cell carry bit output, LSB_Cell_Carry_Out, will be a logic one either if the cell carry input is a logic one or if the cell carry input is a logic zero and the corresponding input bit is a logic one. The last cell carry output generates the signal LSB_Circuit_Carry_Out.

Specifically, LSB circuit 20 has two types of alternating cells. As illustrated, LSB cells 50 and 54 are "even" cells. Conversely, LSB cells 52 and 56 are "odd" cells. Consequently each input, LSB_Cell_In, and each output, LSB_Cell_Out, contains either the designator "Odd" or "Even" referring to the type of cell that receives it or generates it. LSB circuit 20 uses two types of cells so that it may reverse the polarity of the cell carry output, LSB_Cell_Carry_In, between alternating cells. This alternating cell feature allows each cell type to operate faster and require less space than would a single cell type. Consequently, the cell carry output from an even cell is labeled LSB_Cell_Carry_Out_Bar and the cell carry input to an odd cell is labeled LSB_Cell_Carry_In_Bar. Consistent with naming conventions, these signals are active low.

The cell carry input (LSB_Cell_Carry_In) to LSB Cell Even 50 is connected to ground. A cell carry output (LSB_Cell_Carry_Out_Bar) from LSB Cell Even 50 is connected to a cell carry input (LSB_Cell_Carry_In_Bar) of LSB Cell Odd 52. A cell carry output (LSB_Cell_Carry_Out) from LSB Cell ODD 52 is connected to a cell carry input (LSB_Cell_Carry_In) of LSB Cell Even 54. A cell carry output (LSB_Cell_Carry_Out_Bar) from LSB Cell Even 54 is connected to a cell carry input (LSB_Cell_Carry_In_Bar) of LSB Cell Odd 56. A cell carry output of (LSB_Cell_Carry_Out) LSB Cell Odd 56 generates the LSB circuit carry output, LSB_Circuit_Carry_Out. An input, labeled BLOCK, to each cell is connected to the signal LSB_Circuit_Carry_In.

Figure 7:
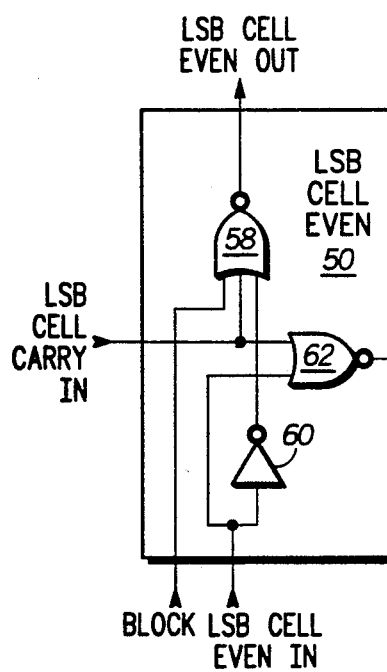
FIG. 7 depicts a logic diagram of the LSB EVEN cell depicted in FIG. 6.

FIG. 7 depicts a logic diagram of LSB Cell Even 50 or 54 depicted in FIG. 6. An output LSB_Cell_Even_Out is generated by an output of a three-input NOR gate 58. The three inputs of NOR gate 58 are connected, respectively, to the output of an inverter 60 and to the inputs BLOCK and LSB_Cell_Carry_In. An input of inverter 60 is connected to the input LSB_Cell_Even_In. The output LSB_Cell_Carry_Out_Bar is generated by an output of a NOR gate 62. First and second inputs to NOR gate 62 are connected to the inputs LSB_Cell_Carry_In and to LSB_Cell_Even_In, respectively.

Figure 8:
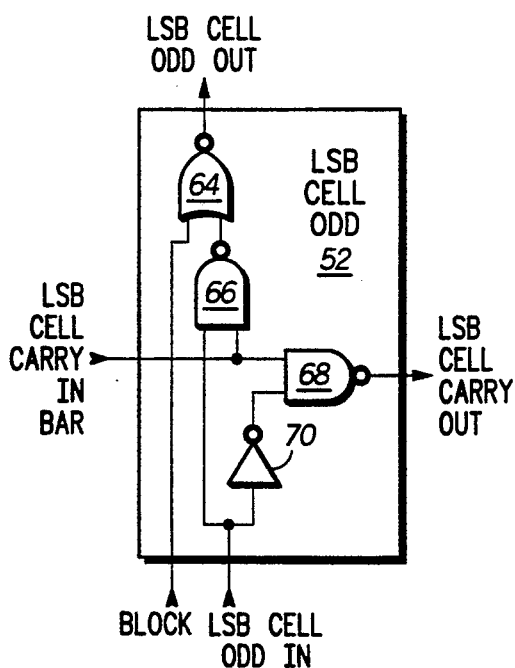
FIG. 8 depicts a logic diagram of the LSB ODD cell depicted in FIG. 6.

FIG. 8 depicts a logic diagram of LSB Cell Odd 52 or 56 depicted in FIG. 6. The output LSB_Cell_Odd_Out is generated by an output of a NOR gate 64. First and second inputs of NOR gate 64 are connected, respectively, to the output of a NAND gate 66 and to the input BLOCK, respectively. First and second inputs to NAND gate 66 are connected to the inputs LSB_Cell_Odd_In and to LSB_Cell_Carry_In_Bar, respectively. The output LSB_Cell_Carry_Out is generated by an output of a NAND gate 68. First and second inputs to NAND gate 68 are connected to the input LSB_Cell_Carry_In_Bar and to the output of an inverter 70, respectively. An input of inverter 70 is connected to the input LSB_Cell_Odd_In.

The disclosed invention has numerous advantages over the prior art. The disclosed invention describes a priority encoder that is able to determine a leading one within a large data word in a relatively short time period. In addition, the disclosed invention is easily adaptable to data words of different sizes without requiring significant redesign. Also, a particular embodiment is described that has been optimized to enhance speed, reduce power consumption and minimize circuit size.

Although the present invention has been described with reference to a specific embodiment, further modifications and improvements will occur to those skilled in the art. For instance, DeMorgan's Theorem (or the duality property) may be used to design equivalent replacement cells for those cells depicted above. It is to be understood therefore, that the invention encompasses all such modifications that do not depart from the spirit and scope of the invention as defined in the appended claims.

What is claimed is:

1. A priority encoder for detecting a leading one within a plurality of data bits, each data bit associated with a different one of a plurality of input signals, the priority encoder comprising:

most significant bit circuitry coupled to at least one of the input signals, the most significant bit circuitry generating a first output signal and a parallel blocking signal, both of the first output signal and the parallel blocking signal representative in a first logic state of a leading one associated with the at least one of the input signals;

a first less significant bit cell coupled to a first one of the input signals and to the parallel blocking signal, the first less significant bit cell generating a second output signal and a less significant carry signal, both the second output signal and the less significant carry signal representative in a first logic state of a leading one associated with the first one of the input signals; and a second less significant bit cell coupled to a second one of the input signals, to the parallel blocking signal and to the less significant carry signal, the second less significant bit cell generating a third output signal representative in a first logic state of a leading one associated with the second one of the input signals.

2. The priority encoder of claim 1 wherein the most significant bit circuitry further comprises:

a first most significant bit cell coupled to a first one of the at least one of the input signals, the first most significant bit cell generating a fourth output signal and a first most significant carry signal, both the fourth output signal and the first most significant carry signal representative in a first logic state of a leading one associated with the first one of the at least one of the input signals; and a second most significant bit cell coupled to a second one of the at least one of the input signals and to the first most significant carry signal, the second less significant bit cell generating a fifth output signal and the parallel blocking signal, the fifth output signal representative in a first logic state of a leading one associated with the one input signal, the parallel blocking signal representative in a first logic state of a leading one associated with the first one or the second one of the at least one of the input signals.

3. The priority encoder of claim 1 wherein the first less significant bit cell further comprises:

a first inverter comprising an input and an output, the input coupled to the first one of the input signals;

a first NOR gate comprising a first, a second and a third input and an output, the first input coupled to the parallel blocking signal, the second input coupled to a first voltage level representative of a first predetermined logic value and the third input coupled to the output of the inverter, the output coupled to the first output signal; and a second NOR gate comprising a first and a second input and an output, the first input coupled to the first voltage level and the second input coupled to the first one of the input signals, the output coupled to the less significant carry signal.

4. The priority encoder of claim 3 wherein the second less significant bit cell further comprises:

a second inverter comprising an input and an output, the input coupled to the second one of the input signals;

a first NAND gate comprising a first and a second input and an output, the first input coupled to the less significant carry signal, the second input coupled to the output of the second inverter, the output coupled to a second less significant output signal;

a second NAND gate comprising a first and a second input and an output, the first input coupled to the input signal, the second input coupled to the less significant carry signal; and a third NOR gate comprising a first and a second input and an output, the first input coupled to parallel blocking signal, the second input coupled to the output of the second NAND gate, the output coupled to the third output signal.

5. The priority encoder of claim 4 wherein the most significant bit circuitry further comprises:

a first most significant bit cell coupled to the first one of the at least one of the input signals, the first most significant bit cell generating a fourth output signal and a first most significant carry signal, both the fourth output signal and the first most significant carry signal representative in a first logic state of a leading one associated with the first one of the at least one of the input signals; and a second most significant bit cell coupled to the second one of the at least one of the input signals and to the first most significant carry signal, the second less significant bit cell generating a fifth output signal and the parallel blocking signal, the fifth output signal representative in a first logic state of a leading one associated with the one input signal, the parallel blocking signal representative in a first logic state of a leading one associated with the first one or the second one of the at least one of the input signals.

6. The priority encoder of claim 5 wherein the first most significant bit cell further comprises:

a third inverter comprising an input and an output, the input coupled to the first one of the at least one of the input signals;

a fourth NOR gate comprising a first and a second input and an output, the first input coupled to the output of the third inverter, the second input coupled to a second voltage level representative of a second predetermined logic value, the output coupled to the fourth output signal; and a fifth NOR gate comprising a first and a second input and an output, the first input coupled to the second voltage level and the second input coupled to the second one of the at least one of the inputs signals, the output coupled to the first most significant carry signal.

7. The priority encoder of claim 6 wherein the second most significant bit cell further comprises:

a fourth inverter comprising an input and an output, the input coupled to second one of the at least one of the input signals;

a third NAND gate comprising a first and a second input and an output, the first input coupled to the second one of the at least one of the input signals, the second input coupled to the first most significant carry signal;

a fifth inverter comprising an input and an output, the input coupled to the output of the third NAND gate, the output coupled to the fifth output signal; and a fourth NAND gate comprising a first and a second input and an output, the first input coupled to the output of the fourth inverter, the second input coupled to the first most significant carry signal, the output coupled to the parallel blocking signal.

8. A priority encoder for detecting the leading one within a plurality of data bits, each bit associated with a different one of a plurality of input signals, the priority encoder comprising:

a most significant bit circuit coupled to a plurality of the input signals, the most significant bit circuit comprising:

for each of the coupled input signals, first circuitry coupled to one of the input signals and to an first blocking signal, each of the first circuitry generating a first output signal, the first output signal logically equal to a first predetermined signal if the one input signal and the first blocking signal are logically equal to a second and third predetermined signal, respectively;

for each of the coupled input signals, second circuitry coupled to one of the input signals and to the first blocking signal, each of the second circuitry generating a second blocking signal, the second blocking signal logically equal to a fourth predetermined signal if the input signal and the first blocking signal are logically equal to a fifth and a sixth predetermined signal, respectively;

at least two less significant bit circuits, each of the at least two less significant bit circuits comprising:

third circuitry coupled to one of the input signals, to a first carry signal and to one blocking signal, each of the third circuitry generating a second output signal, the second output signal logically equal to a seventh predetermined signal if the one input signal, the first carry signal and the one blocking signal are logically equal to an eighth, a ninth and a tenth predetermined signal, respectively; and fourth circuitry coupled to one of the input signals, to a first carry signal and to the one blocking signal, each of the fourth circuitry generating a second carry signal, the second carry signal logically equal to an eleventh predetermined signal if the input signal, the first carry signal and the one blocking signal are logically equal to a twelfth, a thirteenth and a fourteenth predetermined signal, respectively.

9. The priority encoder of claim 8 further comprising:

for each input signal coupled to the most significant bit circuit, first polarity circuitry coupled to the second circuitry for reversing polarity of the first blocking signal; and second polarity circuitry coupled to the fourth circuitry for reversing polarity of the first carry signal.

10. A method for detecting the leading one within a plurality of data bits, each bit associated with a different one of a plurality input signals, the method comprising the steps of:

receiving a first input signal;

generating a first output signal and a blocking signal, the first output signal and the blocking signal logically equal to a first and to a second predetermined signal, respectively, if the first input signal is logically equal to a third predetermined signal;

receiving a second input signal and the blocking signal;

generating a second output signal and a first carry signal, the second output signal and the carry signal logically equal to a fourth and to a fifth predetermined signal, respectively, if the second input signal and the blocking signal are logically equal to a sixth and to a seventh predetermined signal, respectively;

receiving a third input signal, the blocking signal and the first carry signal;

generating a third output signal and a second carry signal, the third output signal and the second carry signal logically equal to an eighth and to a ninth predetermined signal, respectively, if the third input signal, the blocking signal and the first carry signal are logically equal to a tenth, an eleventh and a twelfth predetermined signal, respectively.

* * * * *